April 13, 1937. W. H. MARTIN ET AL 2,077,341
LIQUID CONTAINER
Filed March 6, 1935 2 Sheets-Sheet 1
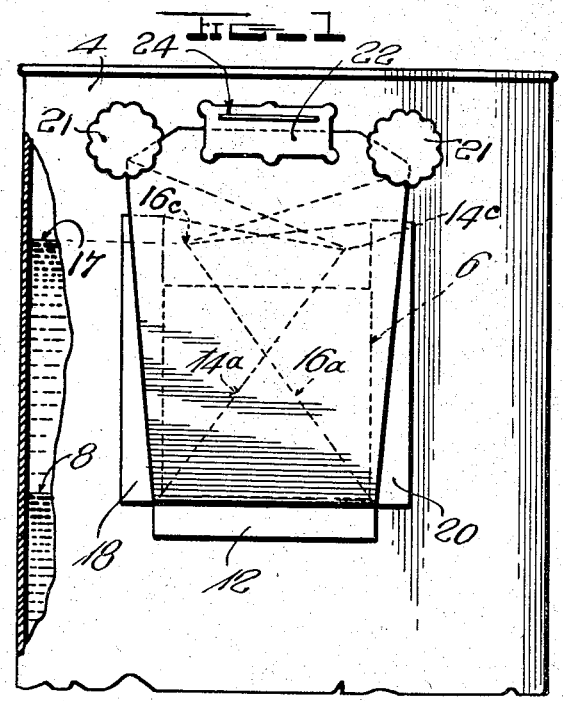
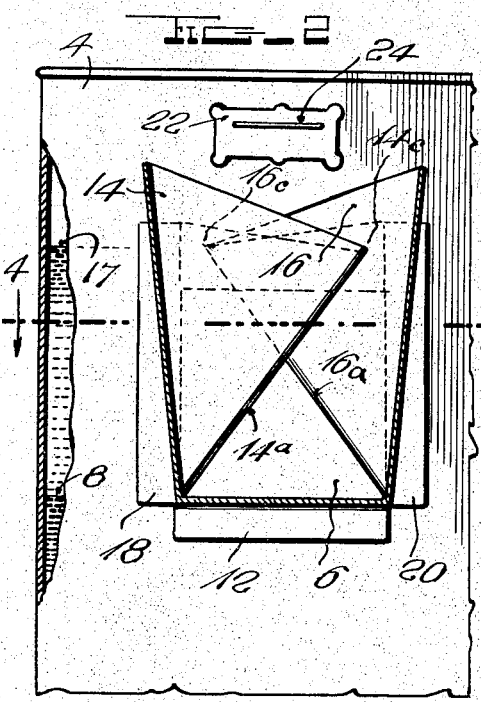
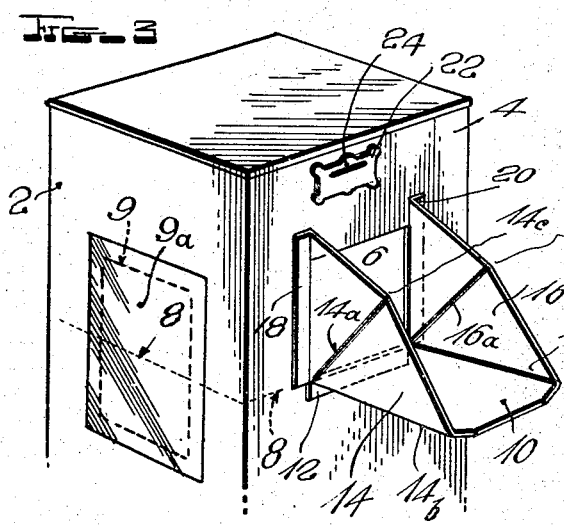
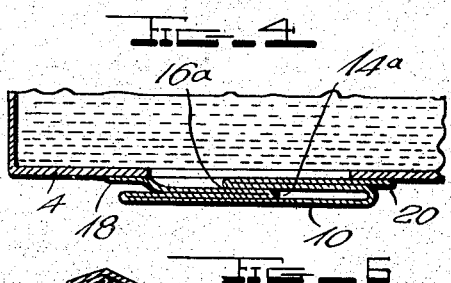
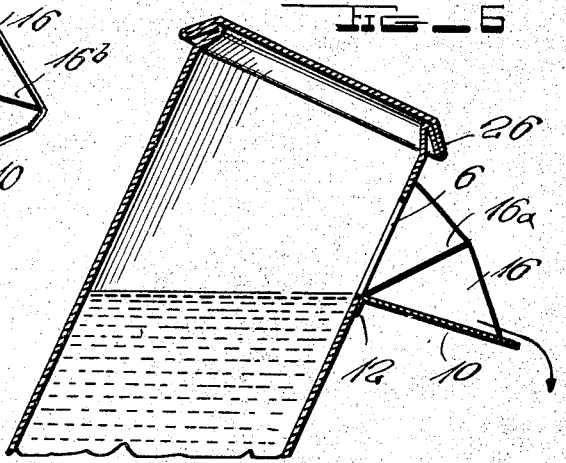
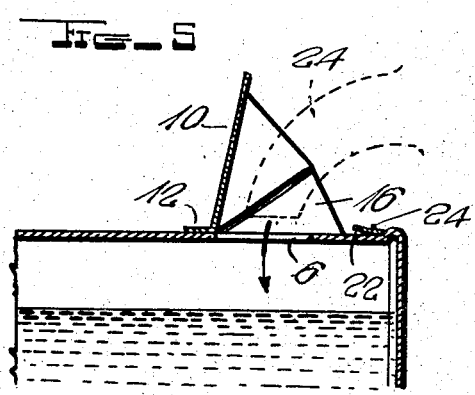
INVENTORS:
Wallace H. Martin
Robert V. H. Salisbury
BY Fisher & Pedersen,
ATTORNEYS.

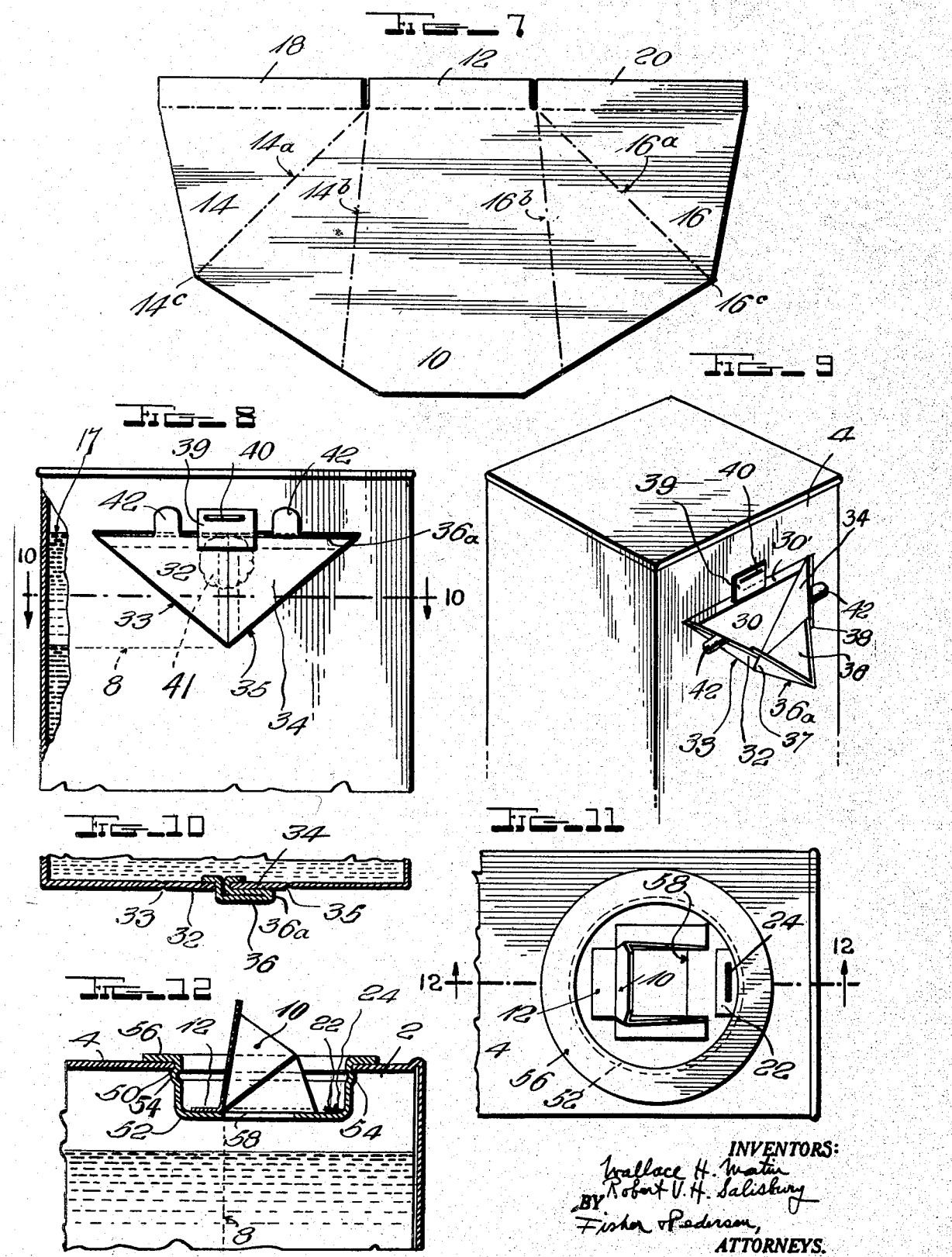

Patented Apr. 13, 1937

2,077,341

UNITED STATES PATENT OFFICE 2,077,341

LIQUID CONTAINER

Wallace H. Martin and Robert V. H. Salisbury, North Tarrytown, N. Y.

Application March 6, 1935, Serial No. 9,674

6 Claims. (Cl. 229—7)

This invention is a container for liquids and, although not limited to a container for milk, it is particularly adapted for milk, being provided with means for withdrawing the cream from the top of the bottle quickly and readily, without disturbing the milk, thus obtaining substantially pure cream without any admixture of milk. The container of the present invention is preferably made of water-proof paper or the like, of sufficient thickness so that when impregnated with paraffin or other suitable water-proofing material, it will be of sufficient rigidity.

The invention will be described in connection with a paper milk bottle of the known rectangular type, although it may be applied to milk bottles of other shapes. The term "bottle" is used in the specification as meaning simply a container rather than a container made of glass.

The advantages of paper milk bottles, which are usually thrown away after they have been used once, are well known and need not be repeated here. Due to the fact that the container is made of paper or the like, such container is particularly susceptible of economical manufacture according to the teachings of this invention, for providing a container from which the cream can be drawn off quickly and expeditiously.

The container of this invention is provided with an opening in the side near the top thereof and the lower edge of this opening, in one form of the invention, is substantially at the cream line. By "cream line" is meant that line or surface at the upper level of the milk and the lower level of the cream. Where the milk is of standard fat content, this cream line will always occupy a rather definite position.

In connection with the above described opening at the cream line, there is associated a dispensing spout, made preferably of water-proof paper, "Cellophane" or the like. The spout is preferably secured to the container by sealing portions of the spout against the wall of the container. This sealing extends along the bottom edge, and along each side edge of the dispensing opening, thereby making an effective liquid-tight seal around the opening so that no liquid will run down the side of the bottle. Such a spout is foldable against the container and when folded serves as a closure; it may be held in its folded or closure-forming position by a readily broken seal, which the user can readily break and so unfold the spout when he wants to draw off the cream.

An important feature of the invention, particularly from the manufacturing point of view, is that the described dispensing opening, which is in the side of the bottle near the top, can also be used as a filling opening, thereby eliminating the necessity of providing the top of the bottle with any sort of filling opening and with a closure for such opening. The single opening in the side of the bottle, according to this invention, can serve the purpose of an opening for filling the bottle with milk, and also for the purpose of drawing off the cream. However, it should be understood that if a particular user should want the usual filling opening in the top of the bottle, that such opening could be provided.

In connection with the foldable spout, such spout preferably comprises a bottom portion and side wings which are provided with folds or the like for preventing leakage. Such folds are so designed that when the spout is in folded position, the low points or apices of the folds are above the upper edge of the dispensing or filling opening, thereby eliminating the possibility of leakage.

In the invention thus far described, the foldable spout is sealed to the side of the container around three sides of the opening. An important variation or modification of this will now be described. In this variation or modification, the container is provided with a filling opening in one side near the top. A closure for this opening is provided in the form of a dished closure cap which will be snapped into place in the filling opening when the bottle is filled with milk. This dished closure cap is itself provided with a relatively small dispensing opening for the outflow of cream. A foldable spout is provided for this dispensing opening, which is sealed to the closure cap around three sides of the dispensing opening as before. With this aspect of the invention, the dispensing opening in the closure cap has its lower edge substantially at the cream line.

In another form of the invention, a filling and dispensing opening of substantially triangular shape is provided. Triangular closure flaps are used, which, when folded, form a closure and when unfolded form a spout.

The main features of the invention having been thus outlined, the invention will be further described in connection with the accompanying drawings illustrating in more detail the preferred embodiments thereof. In these drawings:

Fig. 1 is a side view, partly broken away, of a liquid container in accordance with this invention;

Fig. 2 is a similar view, taken on a vertical section through the folded spout;

Fig. 3 is a perspective view showing the pouring or dispensing spout unfolded;

Fig. 4 is a section on the line 4—4 of Fig. 2;

Fig. 5 shows the manner of filling the container;

Fig. 6 is a sectional view showing the pouring off of the liquid and showing a modification;

Fig. 7 is a plan view showing a form of paper blank for the pouring spout;

Fig. 8 is a view of a modification of the pouring spout;

Fig. 9 is a perspective view of the spout of Fig. 8;

Fig. 10 is a section on the line 10—10 of Fig. 8;

Fig. 11 is a top view of a modification, where a closure cap carrying a pouring spout, is used to close the filling opening; and Fig. 12 is a sectional view on line 12—12 of Fig. 11.

Referring now to these drawings, in which similar reference characters indicate similar parts, the container indicated generally at 2 may be of generally rectangular shape and made of waterproofed paper, as is well understood in this art. One of the side walls, such as 4, of the container, is provided with an opening 6, so placed that its lower edge is substantially at the cream line 8. This opening 6 may be of any suitable shape and is here shown as substantially rectangular.

One wall of the container may be provided with a window 9, extending well above and below the cream line 8, this opening being covered by an adhesively applied transparent sheet 9a of heavy "Cellophane" or similar transparent product. Such a window enhances the sale of the milk, because it evokes the customer to see just how much cream there is in the container. This window 9 could be used as a filling opening, if desired, the container, of course, being laid on its side during the filling and the closure 9a being adhesively secured in place after the filling operation.

Cooperating with the opening 6 is a pouring spout 10, preferably made from a blank of substantially the shape shown in Fig. 7. The spout-forming portion 10 is provided with a tab 12, while the side portions or wings 14 and 16 are provided respectively with tabs 18 and 20. The tabs 12, 18 and 20 are folded outwardly along the dot and dash lines, the tab 12 being sealed or adhesively secured to the wall 4 of the container at the lower edge of the dispensing opening 6, this tab being at least as long as the bottom edge of the opening 6. The tabs 18 and 20 are also sealed or adhesively secured to the side wall of the container, alongside the vertical edges of the opening 6, and preferably extend above the upper edge of the opening, as shown in Fig. 3.

Lines of fold for the wings 14 are shown at 14a and 14b and corresponding lines of fold for the wings 16 are shown at 16a and 16b.

When the spout is folded up, as shown in Figs. 1, 2 and 4, the outer ends of folds 14a and 16a, indicated respectively at 14c and 16c, pass inwardly, forming a bellows or similar type of fold, with the low points of the folds, 14c and 16c, well above the upper edge of the opening 6. The foldable spout is preferably so proportioned with relation to the container that the low points of the folded spout, 14c and 16c, are, when the spout is folded, above the top surface 17 of the cream. With such an arrangement, there is no likelihood of the cream suddenly gushing out, as might happen if the spout were at a low instead of a relatively high level.

The foldable spout 10 and wings 14 and 16 may be made of water-proof paper or the like, or could be made of a transparent cellulose product, such as "Cellophane". Where such a transparent material is used, the purchaser will be able to see the cream, and the sale of the milk thereby enhanced. The transparent spout could be used in conjunction with the window 9, if desired, although if the window 9 is used, there would be little necessity of making the spout of transparent material.

The foldable spout may be sealed in the closed position by one or more adhesively applied frangible seals 21. The upper edge of the spout may also be slipped under a clip 22, made of metal or stiff paper, held in place by a wire clip 23 or by adhesive. The natural elasticity of the folds would tend to draw the spout to the closed position. The spout could also, if desired, be sealed in place with paraffin or the like.

The opening 6, as shown in Fig. 5, can readily be used as a filling opening for filling the bottle with milk, a filling spout being shown at 24. After the bottle has been filled with milk, the spout is folded up and the seals 21 applied and the container thus delivered to the user, who, of course, stores it in his refrigerator in the upright position. The folding spout could be applied to the container after it has been filled with milk, although preferably it is applied to the container during the process of manufacture and the container filled by a dispensing spout which is held open, as shown in Fig. 5.

As evident from Fig. 6, when the spout is open, the cream will readily run out; after it has been segregated, the milk can be readily poured out through the same spout. The spout may be opened as often as necessary, and readily closed by slipping its upper edge under the retaining clip 22. Fig. 6 shows the top of the container provided with a beveled or downward overhang 26, the spout being of a size such that its upper edge may be engaged under the overhang; this arrangement is in place of the retaining clip 22.

Referring now to Figs. 8, 9 and 10, one wall, such as 4, of the container is provided with a substantially triangular opening 30, the low point of which is substantially coincident with the cream line 8.

The pouring spout in this modification comprises two flaps 32 and 34 which may be integral with the side wall 4 of the container or adhesively secured thereto in any suitable way, along the lines 33 and 35, these lines 33 and 35 acting as hinges for the flaps. Flaps 32 and 34 could be cut out or struck from the wall of the container and so would be integral therewith.

The pouring spout is completed by a flexible and foldable member 36 which is adhesively secured to the adjacent edges 37 and 38 of the two flaps, this portion 36 bridging over the gap between these two when they are unfolded, as shown in Fig. 9, to complete the pouring spout. The line of fold for member 36 is shown at 36a, member 36 assuming the position shown in Fig. 8 when folded. The outer end of fold line 36a is preferably at least as high as the cream line 17.

As shown in Fig. 9, the upper edges of the flaps 32 and 34 will, when the spout is folded, overlap and extend above the upper edge 30' of the opening 30, thereby forming a more effective seal along the upper edge of that opening.

The spout is held in folded position by tucking its upper edges under a cardboard or metallic clip 39, held in place by a wire staple or the like

40. A readily frangible seal 41 may also be used to seal up the container at it leaves the dairy. As mentioned in connection with Fig. 1, the spout may be also sealed in place with paraffin or the like, in which case seal 41 may be dispensed with. The spout may be opened as often as desired, and closed by tucking its upper edges under the clip 39.

With this form of the invention, as in the case of Fig. 5, the dispensing opening 30 may be large enough so that it can be used as a filling opening, whereby no filling opening need be provided in the top of the bottle.

Coming now to the modifications shown in Figs. 11 and 12, the container 2 is there shown in the horizontal position, as it would be when being filled. This container is provided in one vertical wall 4 with a filling opening 50. Cooperating with this filling opening 50 is a dished closure 52 made of water-proofed paper, heavy "Cellophane" or the like and provided with an annular outstruck rib 54, of such a size as to snap past the edges of the opening 50, for holding itself in place. The closure cap is also provided with a flange 56.

The cap 52 is provided with a cream dispensing opening 58, the lower edge of the opening 58 being substantially at the cream line 8 when the bottle is in the upright position, and with a pouring spout 10 which may be of substantially the same construction as shown in Figs. 1 and 3 or in Figs. 8 and 9. This spout, when folded, is inset with respect to the wall 4 of the container and is thereby protected during handling of the container.

With this form of the invention, with the closure cap removed, the container is filled with milk through the filling opening 50. The closure cap is then snapped into place, the dispensing spout 10 being sealed up in its folded position, and the container thus delivered to the user. The user draws off the cream, as has been described, by unfolding the spout 10, the cream passing out through the opening 58 in the closure cap. After the cream has been drawn off, the milk can be poured out by removing the closure member 52 entirely, and the filling opening 50 then being used as a dispensing opening.

In describing the invention, the opening for drawing off the cream has been described as in one "side" of the container. By "side" is meant one of the vertical walls of the container. Referring to Fig. 12, for example, the container is shown in the horizontal position. If it is customary for the dairy and the user to allow the container normally to lie in the position of Fig. 12, then the right hand wall, there shown as the top, would become the "side" of the container, being vertical, and the spout would be placed in such right hand wall.

While the preferred embodiments of the invention have been described in some detail, it should be understood that our invention is not limited to these details, but may be carried out in other ways, as falling within the scope of the claims.

We claim as our invention:

1. A container for liquids, provided with an opening in one side; and foldable spout-forming means sealed to the container, part way round said opening, said spout-forming means including trough-forming foldable wings for confining the liquid in the dispensing spout and for preventing leakage around the edge of the opening, the apices or low points of the wings, when folded, being at least as high as the upper edge of said opening.

2. A container for liquids, provided with an opening in one side; and foldable spout-forming means sealed to the container, part way round said opening, said spout-forming means including trough-forming foldable wings for confining the liquid in the dispensing spout and for preventing leakage around the edge of the opening, said spout-forming means, when folded, forming a closure for said opening, the apices or low points of the wings, when folded, being substantially as high as the upper edge of said opening.

3. A container for milk, having an opening in one wall thereof, a delivery spout in liquid-tight engagement with the wall of the container adjacent said opening, said spout comprising trough-forming foldable wings attached to the bottom of the spout and having their inner edges sealed to the container along the edges of said opening, said wings when in folded position, having their apices or low points of their folds at least as high as the top edge of the said opening, said delivery spout having its bottom substantially at the cream line.

4. A container for milk, provided with a single filling and dispensing opening, the rest of the container being normally permanently closed, the lower edge of the filling opening being substantially at the cream line; and foldable spout-forming means, having portions thereof sealed to the container, part way around said filling opening, said spout-forming means including trough-forming bellows-folds for confining the liquid to the container and for maintaining a liquid seal for the entire area of the opening, the spout-forming means being placed so that when it is opened and unfolded, substantially all the cream will be drained off, said spout-forming means, when folded, forming a closure for said opening all of the free edges of the folds of which extend above the upper edge of said opening, and frangible means for securing the spout-forming means in its folded or closure-forming position.

5. A container for milk or the like, provided with an opening in one side, near the top, and a foldable spout, including trough-forming foldable wings, sealed to the wall of the container along the bottom and along the sides of said opening, in liquid-tight engagement, the bottom of the spout, when unfolded, being substantially at the level of the cream line, the spout being made of transparent material, such as "Cellophane", and means for holding the spout in closed, folded position.

6. A container for liquids provided with an opening on one side; foldable spout forming means secured to the container along the bottom and the adjacent sides in the proximity of the periphery of said opening, said spout forming means comprising walls to direct the outward flow of said liquid when in unfolded, extended position, the spout in folded position forming a closure for said opening and all of the free edges of the foldable spout extending above the uppermost edge of said opening in folded position.

WALLACE H. MARTIN.
ROBERT V. H. SALISBURY.